(12) United States Patent
Yao et al.

(10) Patent No.: US 11,215,854 B2
(45) Date of Patent: Jan. 4, 2022

(54) APPARATUS FOR PHOTO-ALIGNMENT PROCESS, METHOD OF FABRICATING A LIQUID CRYSTAL DISPLAY SUBSTRATE, AND METHOD OF FABRICATING AN APPARATUS FOR PHOTO-ALIGNMENT PROCESS

(71) Applicants: Hefei Xinsheng Optoelectronics Technology Co., Ltd., Anhui (CN); BOE Technology Group Co., Ltd., Beijing (CN)

(72) Inventors: Chengpeng Yao, Beijing (CN); Lei Guo, Beijing (CN); Ke Dai, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 472 days.

(21) Appl. No.: 16/332,318

(22) PCT Filed: Apr. 24, 2018

(86) PCT No.: PCT/CN2018/084222
§ 371 (c)(1),
(2) Date: Mar. 11, 2019

(87) PCT Pub. No.: WO2019/204978
PCT Pub. Date: Oct. 31, 2019

(65) Prior Publication Data
US 2021/0333576 A1   Oct. 28, 2021

(51) Int. Cl.
*G02F 1/13* (2006.01)
*G02F 1/1337* (2006.01)
(Continued)

(52) U.S. Cl.
CPC ........ *G02F 1/1303* (2013.01); *C09K 11/7773* (2013.01); *G01J 1/0488* (2013.01);
(Continued)

(58) Field of Classification Search
CPC . G02F 1/1303; G02F 1/133788; G02B 5/208; C09K 11/7773; G01J 1/0488; G01J 1/42
See application file for complete search history.

(56) References Cited

U.S. PATENT DOCUMENTS

2010/0197186 A1* 8/2010 Shin ................ C08G 59/32
445/24
2016/0370597 A1* 12/2016 Kakubari ............. G02B 27/286

FOREIGN PATENT DOCUMENTS

| JP | 2006309170 A | * 11/2006 | |
| JP | 2008107453 A | * 5/2008 | |
| KR | 20060129557 A | * 12/2006 | ....... G02F 1/133788 |

* cited by examiner

*Primary Examiner* — Marcus H Taningco
(74) *Attorney, Agent, or Firm* — Intellectual Valley Law, P.C.

(57) ABSTRACT

The present application provides an apparatus for a photo-alignment process. The apparatus for a photo-alignment process includes a reflector, an up-conversion layer, and a polarizer optically coupled together. The reflector is configured to reflect an infrared light and provide a reflected infrared light to the up-conversion layer. The up-conversion layer is configured to convert the reflected infrared light to an ultraviolet light, and provide the ultraviolet light to the polarizer. The polarizer is configured to convert the ultraviolet light to a polarized ultraviolet light for the photo-alignment process.

20 Claims, 6 Drawing Sheets

(51) Int. Cl.
*C09K 11/77* (2006.01)
*G01J 1/04* (2006.01)
*G01J 1/42* (2006.01)
*G02B 5/20* (2006.01)

(52) U.S. Cl.
CPC ............... *G01J 1/42* (2013.01); *G02B 5/208* (2013.01); *G02F 1/133788* (2013.01)

APPARATUS FOR PHOTO-ALIGNMENT PROCESS, METHOD OF FABRICATING A LIQUID CRYSTAL DISPLAY SUBSTRATE, AND METHOD OF FABRICATING AN APPARATUS FOR PHOTO-ALIGNMENT PROCESS

CROSS-REFERENCE TO RELATED APPLICATION

This application is a national stage application under 35 U.S.C. § 371 of International Application No. PCT/CN2018/084222, filed Apr. 24, 2018, the contents of which are incorporated by reference in the entirety.

TECHNICAL FIELD

The present invention relates to display technology, more particularly, to an apparatus for photo-alignment process, a method of fabricating a liquid crystal display substrate, and a method of fabricating an apparatus for photo-alignment process.

BACKGROUND

A liquid crystal display device produces an image by applying an electric field to a liquid crystal layer between an array substrate and a counter substrate (e.g., a color filter substrate). The electric field changes an alignment direction of the liquid crystal molecules in a liquid crystal layer. Light transmittance of the liquid crystal layer is adjusted when the alignment direction of the liquid crystal molecules changes. The liquid crystal molecules in a liquid crystal display device are pre-aligned in an alignment direction. Typically, an alignment film is applied to one or both of an array substrate and a counter substrate. The alignment film is then aligned to achieve an alignment direction. For example, microgrooves for inducing liquid crystal molecules to align in a certain direction can be formed by rubbing a surface of the alignment film in a fixed direction. In another example, the alignment film includes a photo-alignment material. The photo-alignment material can be aligned by irradiation of a polarized ultraviolet light. In a photo-alignment process, the photo-alignment material absorbs the polarized ultraviolet light, undergoes a decomposition or an isomerization, thereby achieving optical anisotropy. The optical anisotropy can induce liquid crystal molecules to align along an alignment direction.

SUMMARY

In one aspect, the present invention provides an apparatus for a photo-alignment process, comprising a reflector, an up-conversion layer, and a polarizer optically coupled together; wherein the reflector is configured to reflect an infrared light and provide a reflected infrared light to the up-conversion layer; the up-conversion layer is configured to convert the reflected infrared light to an ultraviolet light, and provide the ultraviolet light to the polarizer; and the polarizer is configured to convert the ultraviolet light to a polarized ultraviolet light for the photo-alignment process.

Optionally, the apparatus further comprises a support for receiving a substrate having a photo-alignment material layer thereon; wherein the up-conversion layer is between the reflector and the polarizer; the polarizer is between the up-conversion layer and the support; and the polarized ultraviolet light from the polarizer is configured to irradiate on the photo-alignment material layer on the substrate, thereby aligning the photo-alignment material layer.

Optionally, the support is substantially transparent.

Optionally, the apparatus further comprises an infrared light source configured to irradiate the infrared light on the photo-alignment material layer, thereby curing the photo-alignment material layer; the photo-alignment material layer being on a side of the support distal to the infrared light source.

Optionally, the infrared light from the infrared light source is configured to sequentially transmit through the polarizer and the up-conversion layer to the reflector, and subsequently be reflected by the reflector to generate the reflected infrared light.

Optionally, an optical path of the infrared light along a direction from the infrared light source through the photo-alignment material layer to the reflector is substantially non-intersecting with the polarizer and substantially non-intersecting with the up-conversion layer.

Optionally, the apparatus further comprises an infrared light cut filter between the up-conversion layer and the photo-alignment material layer for filtering residual infrared light from the ultraviolet light or the polarized ultraviolet light.

Optionally, the infrared light cut filter is a directional infrared light cut filter configured to allow the infrared light to pass through along a direction from an infrared light source toward the reflector, and block the reflected infrared light along a direction from the up-conversion layer toward the photo-alignment material layer.

Optionally, the apparatus further comprises an infrared light detector between the support and the polarizer, and configured to detect an intensity of the infrared light passing through the photo-alignment material layer.

Optionally, the up-conversion layer comprises a doped sodium yttrium fluoride.

Optionally, the apparatus is absent of any self-emitting ultraviolet light source.

Optionally, the apparatus further comprises a substantially transparent window on a side of the polarizer distal to the up-conversion layer.

In another aspect, the present invention provides a method of fabricating a liquid crystal display substrate, comprising irradiating an infrared light on a photo-alignment material layer to cure the photo-alignment material layer; reflecting the infrared light to generate a reflected infrared light; converting the reflected infrared light to an ultraviolet light; converting the ultraviolet light to a polarized ultraviolet light; and irradiating the polarized ultraviolet light on the photo-alignment material layer on a substrate to align the photo-alignment material layer; wherein irradiating the infrared light and irradiating the polarized ultraviolet light are performed substantially simultaneously.

Optionally, the method further comprises providing a substrate having a photo-alignment material layer thereon on a support; wherein reflecting the infrared light is performed subsequent to the infrared light transmitting through the photo-alignment material layer.

Optionally, the method further comprises providing an infrared light source configured to irradiate the infrared light on the photo-alignment material layer thereby curing the photo-alignment material layer, the photo-alignment material layer being on a side of the support distal to the infrared light source.

Optionally, subsequent to the infrared light transmitting through the photo-alignment material layer, the method further comprises transmitting the infrared light through a polarizer and an up-conversion layer prior to reflecting the infrared light.

Optionally, irradiating the infrared light and irradiating the polarized ultraviolet light are performed so that the infrared light and the polarized ultraviolet light are irradiated on two opposite sides of the photo-alignment material layer.

Optionally, the method further comprises filtering residual infrared light from the ultraviolet light or the polarized ultraviolet light.

Optionally, the method further comprises detecting an intensity of the infrared light transmitted through the photo-alignment material layer.

In another aspect, the present invention provides a method of fabricating an apparatus for a photo-alignment process, comprising forming a reflector configured to reflect an infrared light; forming an up-conversion layer configured to convert the infrared light to an ultraviolet light; forming a polarizer configured to converting the ultraviolet light to a polarized ultraviolet light; and optically coupling the reflector, the up-conversion layer, and the polarizer together so that the reflector is configured to reflect the infrared light and provide a reflected infrared light to the up-conversion layer; the up-conversion layer is configured to convert the reflected infrared light to the ultraviolet light, and provide the ultraviolet light to the polarizer; and the polarizer is configured to convert the ultraviolet light to the polarized ultraviolet light for the photo-alignment process.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In conventional photo-alignment processes, a photo-alignment film is coated on a display substrate, followed by curing the photo-alignment material layer in a baking apparatus. After the photo-alignment material layer is cured, the photo-alignment material layer and the display substrate are together transferred to another chamber for photo-alignment. There, an ultraviolet light source is used for aligning the photo-alignment material layer. Issues associated with the conventional photo-alignment processes include low efficiency and contamination during the transfer process (e.g., particles).

Accordingly, the present disclosure provides, inter alia, an apparatus for photo-alignment process, a method of fabricating a liquid crystal display substrate, and a method of fabricating an apparatus for photo-alignment process that substantially obviate one or more of the problems due to limitations and disadvantages of the related art. In one aspect, the present disclosure provides an apparatus for photo-alignment process. In some embodiments, the apparatus for photo-alignment process includes a reflector, an up-conversion layer, and a polarizer optically coupled together. The reflector is configured to reflect an infrared light and provide a reflected infrared light to the up-conversion layer. The up-conversion layer is configured to convert the reflected infrared light to an ultraviolet light, and provide the ultraviolet light to the polarizer. The polarizer is configured to convert the ultraviolet light to a polarized ultraviolet light for the photo-alignment process. Optionally, the up-conversion layer is between the reflector and the polarizer.

Figure 1:
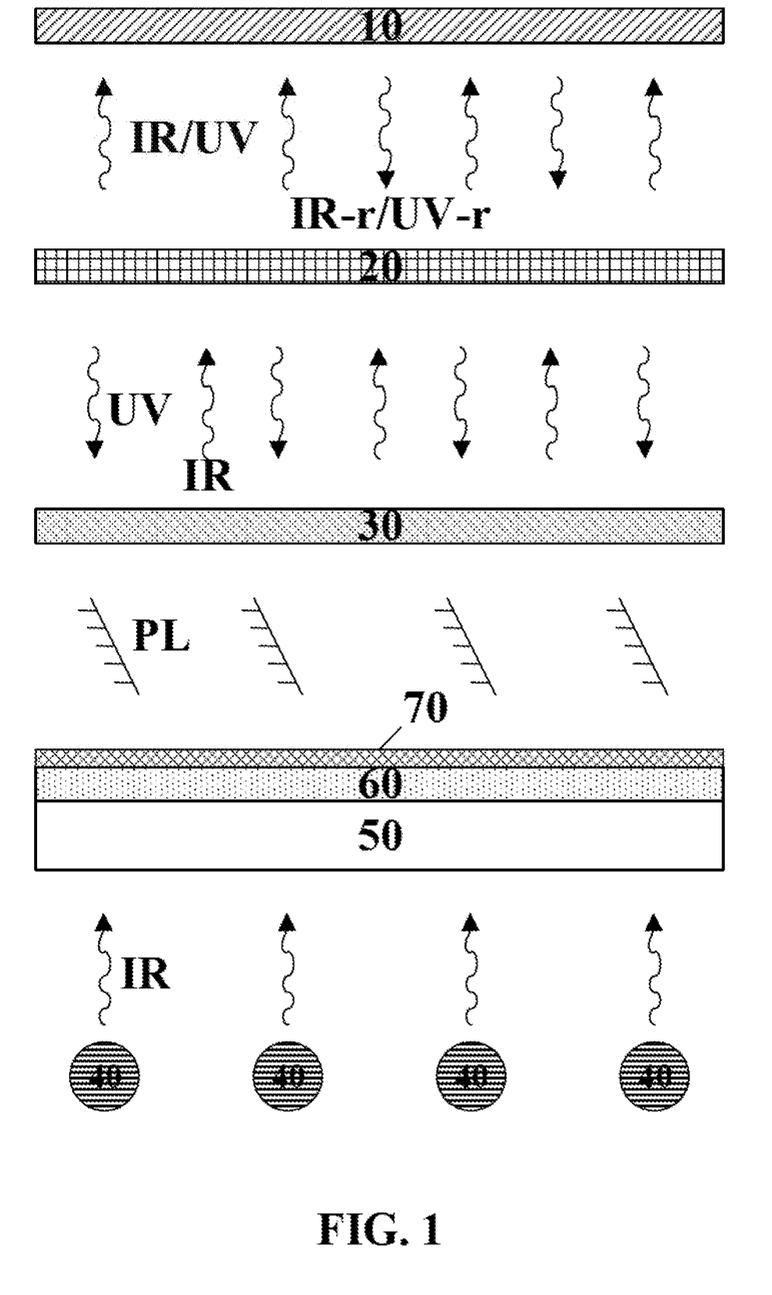
FIG. 1 is a schematic diagram illustrating the structure of an apparatus for photo-alignment process in some embodiments according to the present disclosure.

FIG. 1 is a schematic diagram illustrating the structure of an apparatus for photo-alignment process in some embodiments according to the present disclosure. Referring to FIG. 1, the apparatus for photo-alignment process in some embodiments includes a reflector 10 configured to reflect an infrared light IR; an up-conversion layer 20 configured to convert the infrared light IR to an ultraviolet light UV; and a polarizer 30 configured to converting the ultraviolet light UV to a polarized ultraviolet light PL. The up-conversion layer 20 is between the reflector 10 and the polarizer 30. The reflector 10, the up-conversion layer 20, and the polarizer 30 are optically coupled together in the present apparatus for photo-alignment process. In one example, the up-conversion layer 20 is disposed between the reflector 10 and the polarizer 30. Specifically, the reflector 10 is configured to reflect the infrared light and provide a reflected infrared light to the up-conversion layer 20, the up-conversion layer 20 is configured to convert the reflected infrared light to the ultraviolet light, and provide the ultraviolet light to the polarizer 30, and the polarizer 30 is configured to convert the ultraviolet light to the polarized ultraviolet light for aligning a photo-alignment material layer.

The apparatus for photo-alignment process in some embodiments further includes a support 50 for receiving a substrate having a photo-alignment material layer thereon. FIG. 1 shows a substrate 60 having a photo-alignment material layer 70 formed on a side of the substrate 60. The substrate 60 having the photo-alignment material layer 70 is placed on the support 50. Optionally, the up-conversion layer 20 is between the reflector 10 and the polarizer 30, and the polarizer 30 is between the up-conversion layer 20 and the support 50. In the alignment process, the substrate 60 having the photo-alignment material layer 70 is placed between the support 50 and the polarizer 30, with the photo-alignment material layer 70 on a side of the substrate 60 facing away the support 50. In the alignment process, the polarized ultraviolet light from the polarizer 30 irradiates on the photo-alignment material layer 70 on the substrate 60, thereby aligning the photo-alignment material layer 70.

Various appropriate materials may be used for making the support 50. Optionally, the support 50 is a substantially transparent so that the infrared light IR transmits through the support 50 and substrate 60, and irradiates on the photo-alignment material layer 70. As used herein, the term "substantially transparent" means at least 50 percent (e.g., at least 60 percent, at least 70 percent, at least 80 percent, at least 90 percent, and at least 95 percent) of light in the visible wavelength range transmitted therethrough. Examples of appropriate materials for making the support 50 includes glass, quartz, substantially transparent polymer materials, and so on.

Various appropriate materials may be used for making the up-conversion layer 20. Optionally, the up-conversion layer 20 includes an infrared light to ultraviolet light up-conversion material. Optionally, the infrared light to ultraviolet light up-conversion material includes a carrier material and a dopant. The dopant may be one or a combination of a lanthanoid ion, a semiconductor material, and a transition metal. Examples of dopants include lanthanide (La), cerium (Ce), praseodymium (Pr), neodymium (Nd), promethium (Pm), samarium (Sm), europium (Eu), gadolinium (Gd), terbium (Th), dysprosium (Dy), holmium (Ho), erbium (Er), thulium (Tm), ytterbium (Yb), lutetium (Lu), scandium (Sc), yttrium (Y), or any combination thereof. The carrier material may include one or a combination of a fluoride, an oxide, a sulfur-containing compound, an oxyfluoride, and a halide. Examples of appropriate carrier materials include sodium yttrium fluoride ($NaYF_4$), yttrium fluoride ($YF_3$), calcium fluoride ($CaF_2$), or any combination thereof. Non-limiting examples of up-conversion materials include $NaYF_4$ doped with Yb and Tm, $NaYF_4$ doped with Er and Yb, $YF_3$ doped with $Yb^{3+}$ and $Tm^{3+}$, $CaF_2$ doped with $Er^{3+}$, and $Y_{1.838-x}Gd_xYb_{0.16}Ho_{0.002}O_3$ doped with $Gd^{3+}$ (for example, X=0.16, 0.4, 1.0, or 1.4; optionally, X is 1.0). Optionally, the up-conversion layer 20 includes $NaYF_4$ doped with Er and Yb.

The present apparatus does not require an ultra-violet light source (e.g., a self-emitting ultraviolet light source) for aligning the photo-alignment material layer 70. In some embodiments, the apparatus includes an infrared light source 40 configured to irradiate the infrared light IR on the photo-alignment material layer 70 for curing the photo-alignment material layer 70, when the photo-alignment material layer 70 is disposed on a side of the support 50 distal to the infrared light source 40, and on a side of the substrate 60 distal to the infrared light source 40.

In some embodiments, the apparatus further includes an infrared light source 40 configured to irradiate the infrared light IR on the photo-alignment material layer 70 on a side of the support 50 and the substrate 60 distal to the infrared light source 40, thereby curing the photo-alignment material layer 70.

Referring to FIG. 1, the infrared light IR emitted from the infrared light source 40 is configured to transmit through the support 50 and the substrate 60, and irradiate on a side of the photo-alignment material layer 70. When the photo-alignment material layer 70 is coated on the substrate 60, it needs to be cured. By having the infrared light source 40 on a side of the support 50 distal to the photo-alignment material layer 70, the infrared light IR emitted from the infrared light source 40 can cure the photo-alignment material layer 70. In FIG. 1, the infrared light IR (after transmitting through the photo-alignment material layer 70) continues to transmit, in a sequential order, through the polarizer 30 and the up-conversion layer 20 to the reflector 10. Subsequently, the infrared light IR is reflected by the reflector 10.

In some embodiments, when the infrared light IR transmits through the up-conversion layer 20 toward the reflector 10, a portion of the infrared light IR is converted into an ultraviolet light, which is reflected by the reflector 10 along with the reflected infrared light (denoted as IR-r/UV-r in FIG. 1). The reflected infrared light IR-r and ultraviolet light UV-r transmit through the up-conversion layer 20, and are converted into an ultraviolet light UV. The ultraviolet light UV passes through the polarizer 30, and is converted into a polarized ultraviolet light PL. The polarized ultraviolet light PL then irradiates on the photo-alignment material layer 70, thereby aligning the photo-alignment material on the photo-alignment material layer 70. Thus, the curing and alignment processes of the photo-alignment material layer 70 can be performed substantially simultaneously using the present apparatus.

Figure 2:
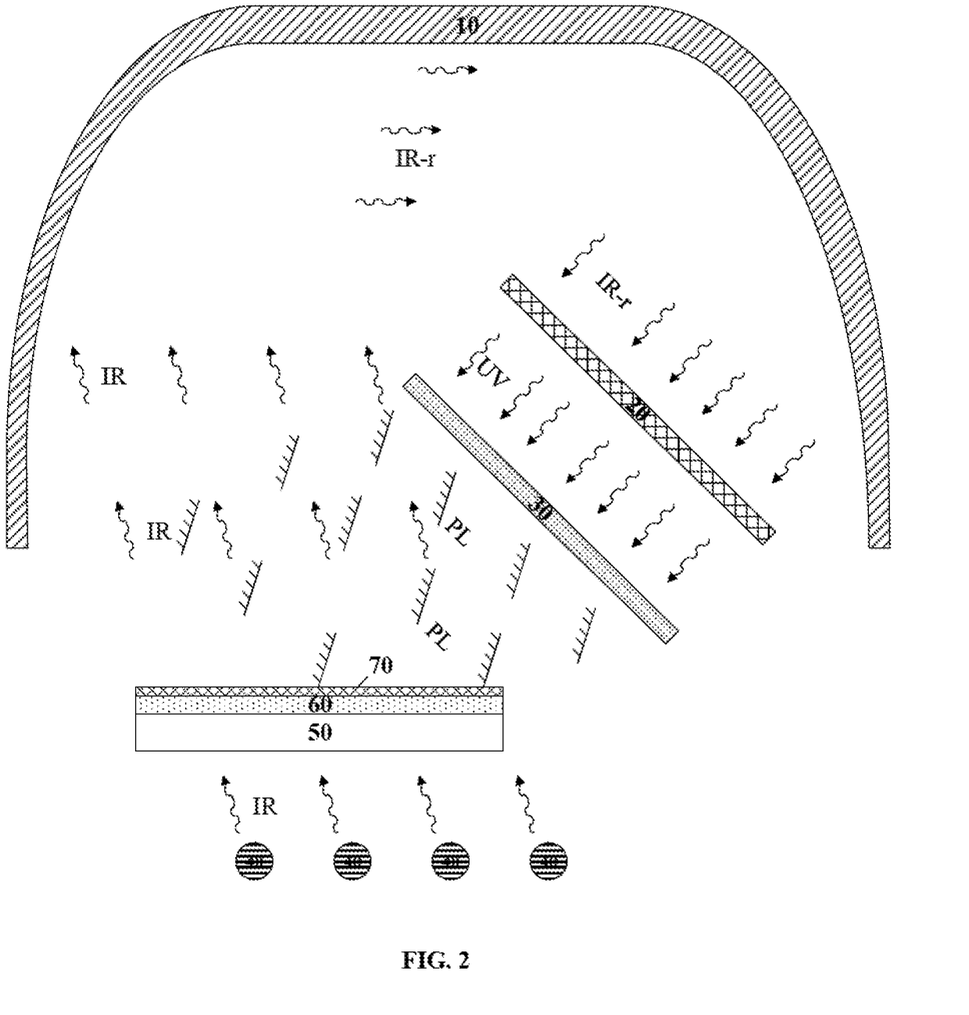
FIG. 2 is a schematic diagram illustrating the structure of an apparatus for photo-alignment process in some embodiments according to the present disclosure.

FIG. 2 is a schematic diagram illustrating the structure of an apparatus for photo-alignment process in some embodiments according to the present disclosure. Referring to FIG. 2, the apparatus for the photo-alignment process is similar to the one illustrated in FIG. 1, except that the up-conversion layer 20 and the polarizer 30 are disposed in positions such that the infrared light IR emitted from the infrared light source 40 does not directly irradiate on the up-conversion layer 20 and the polarizer 30, but only the reflected infrared light IR-r reflected by the reflector 10 irradiates on the up-conversion layer 20 and the polarizer 30. Thus, in some embodiments, an optical path of the infrared light IR along a direction from the infrared light source 40 through the photo-alignment material layer 70 to the reflector 10 is substantially non-intersecting with the polarizer 30 and substantially non-intersecting with the up-conversion layer 20.

Specifically, as shown in FIG. 2, the infrared light source 40 emits the infrared light IR, which transmits through the support 50, the substrate 60, and irradiates on the photo-alignment material layer 70 to cure the photo-alignment material layer 70. The infrared light IR transmits through the photo-alignment material layer 70, and continues its optical path until it is reflected by the reflector 10. The infrared light source 40 emits the infrared light IR at an angle with respect to the photo-alignment material layer 70 such that the optical path of the infrared light IR before it is reflected by the reflector 10 does not cross over the polarizer 30 and the up-conversion layer 20. The reflector 10 is configured to reflect the infrared light IR toward the up-conversion layer 20. The reflected infrared light IR-r travels along an optical path toward the up-conversion layer 20, and is converted into the ultraviolet light UV by the up-conversion layer 20. The ultraviolet light UV continues to transmit through the polarizer 30, and is converted into the polarized ultraviolet light PL. The polarized ultraviolet light PL then irradiates on the photo-alignment material layer 70. The photo-alignment material layer 70 is cured and aligned substantially simultaneously.

Figure 3:
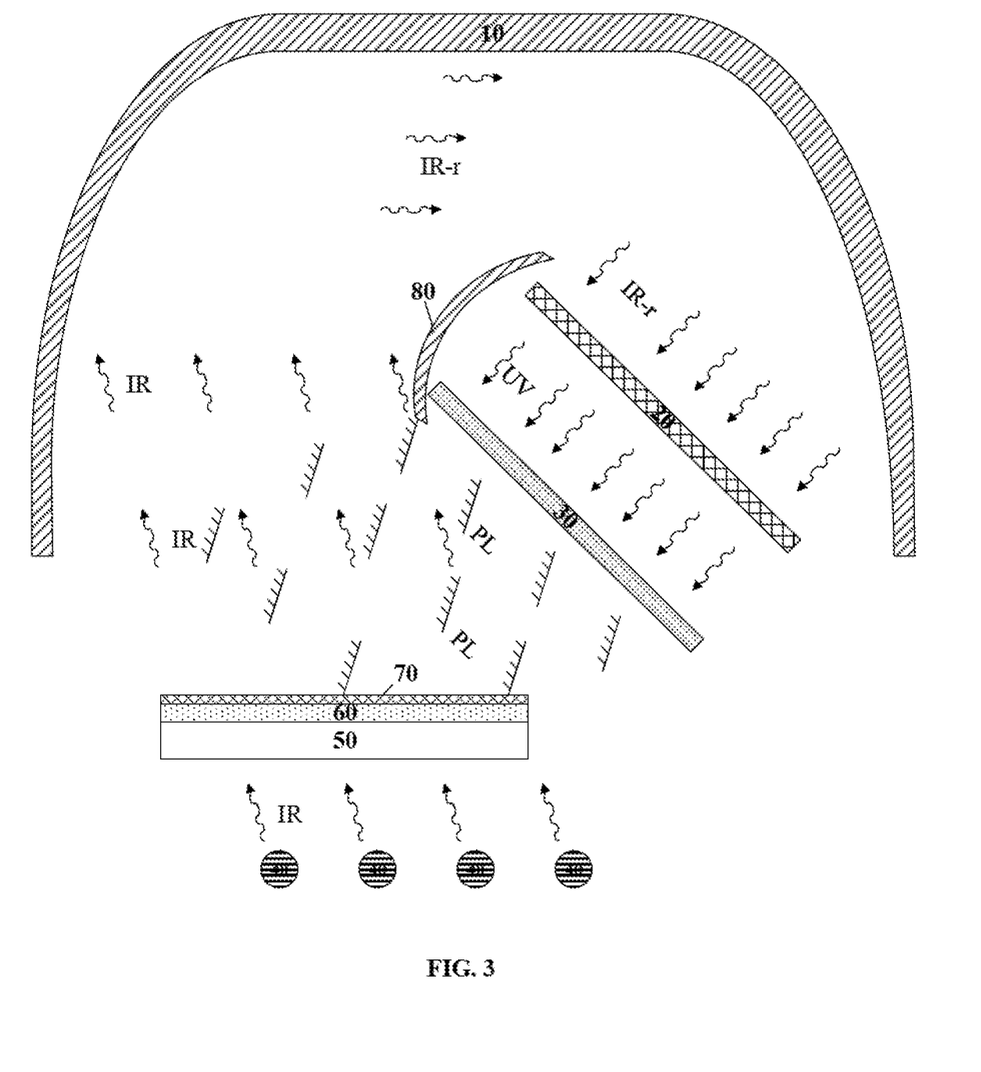
FIG. 3 is a schematic diagram illustrating the structure of an apparatus for photo-alignment process in some embodiments according to the present disclosure.

FIG. 3 is a schematic diagram illustrating the structure of an apparatus for photo-alignment process in some embodiments according to the present disclosure. Referring to FIG. 3, the apparatus in some embodiments further includes a barrier 80 for preventing the infrared light IR from directly irradiating on the polarizer 30 and the up-conversion layer 20, so that the reflected infrared light IR-r but not the infrared light IR irradiates on the polarizer 30 and the up-conversion layer 20. Optionally, the barrier 80 separates the optical path of the infrared light IR from the polarizer 30 and the up-conversion layer 20.

Figure 4:
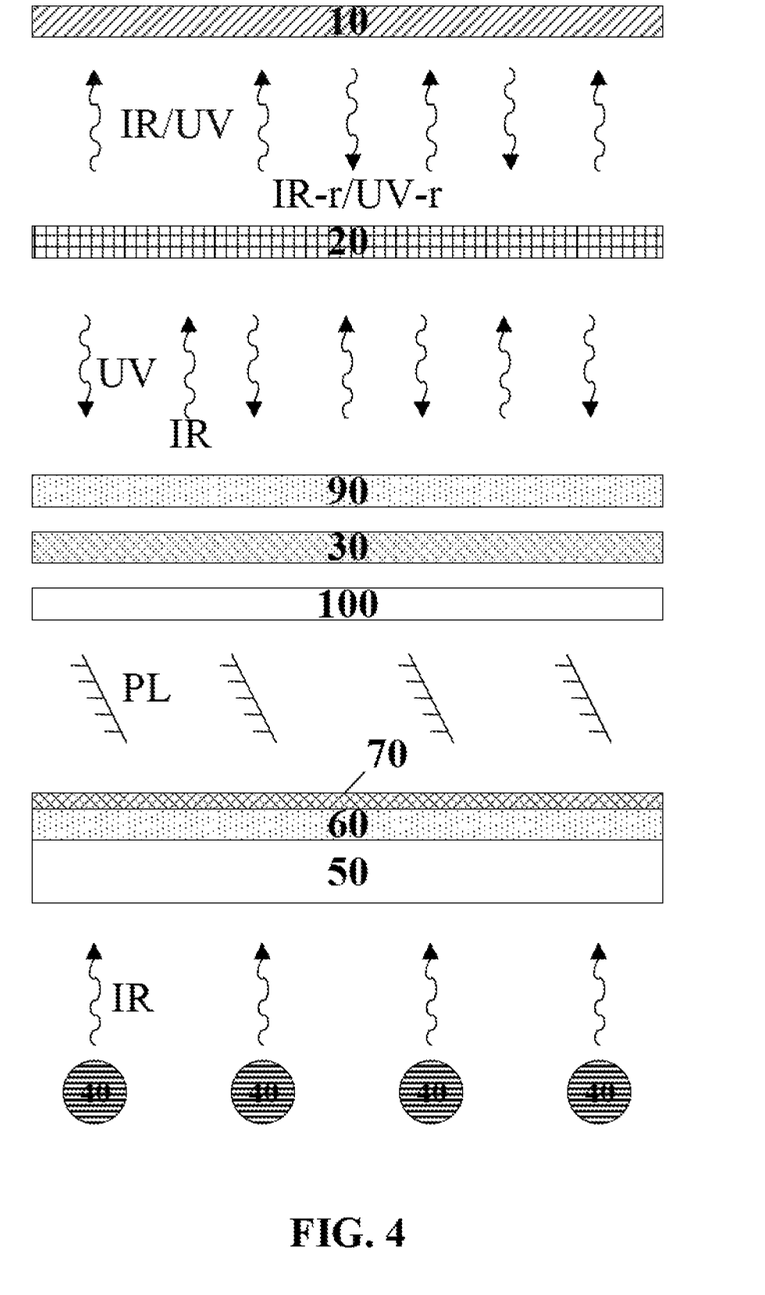
FIG. 4 is a schematic diagram illustrating the structure of an apparatus for photo-alignment process in some embodiments according to the present disclosure.

FIG. 4 is a schematic diagram illustrating the structure of an apparatus for photo-alignment process in some embodiments according to the present disclosure. Referring to FIG. 4, the apparatus in some embodiments further includes an infrared light cut filter 90 between the up-conversion layer 20 and the photo-alignment material layer 70 for filtering residual infrared light from the ultraviolet light UV or the polarized ultraviolet light PL. Optionally, the infrared light cut filter 90 is between the up-conversion layer 20 and the polarizer 30, and is configured to filter residual infrared light from the ultraviolet light UV. Optionally, the infrared light cut filter 90 is between the polarizer 30 and the photo-alignment material layer 70, and is configured to filter residual infrared light from the polarized ultraviolet light PL. Optionally, the apparatus includes an infrared light cut filter 90 between the up-conversion layer 20 and the polarizer 30 for filtering residual infrared light from the ultraviolet light UV, and an infrared light cut filter 90 between the polarizer 30 and the photo-alignment material layer 70 for filtering residual infrared light from the polarized ultraviolet light PL.

In some embodiments, the infrared light cut filter 90 is a directional infrared light cut filter configured to allow the infrared light IR to pass through along a direction from the infrared light source 40 toward the reflector 10, and block the reflected infrared light IR-r (e.g., as a residual infrared light mixed with the ultraviolet light V or mixed with the polarized ultraviolet light PL) along a direction from the up-conversion layer 20 toward the photo-alignment material layer 70.

Figure 5:
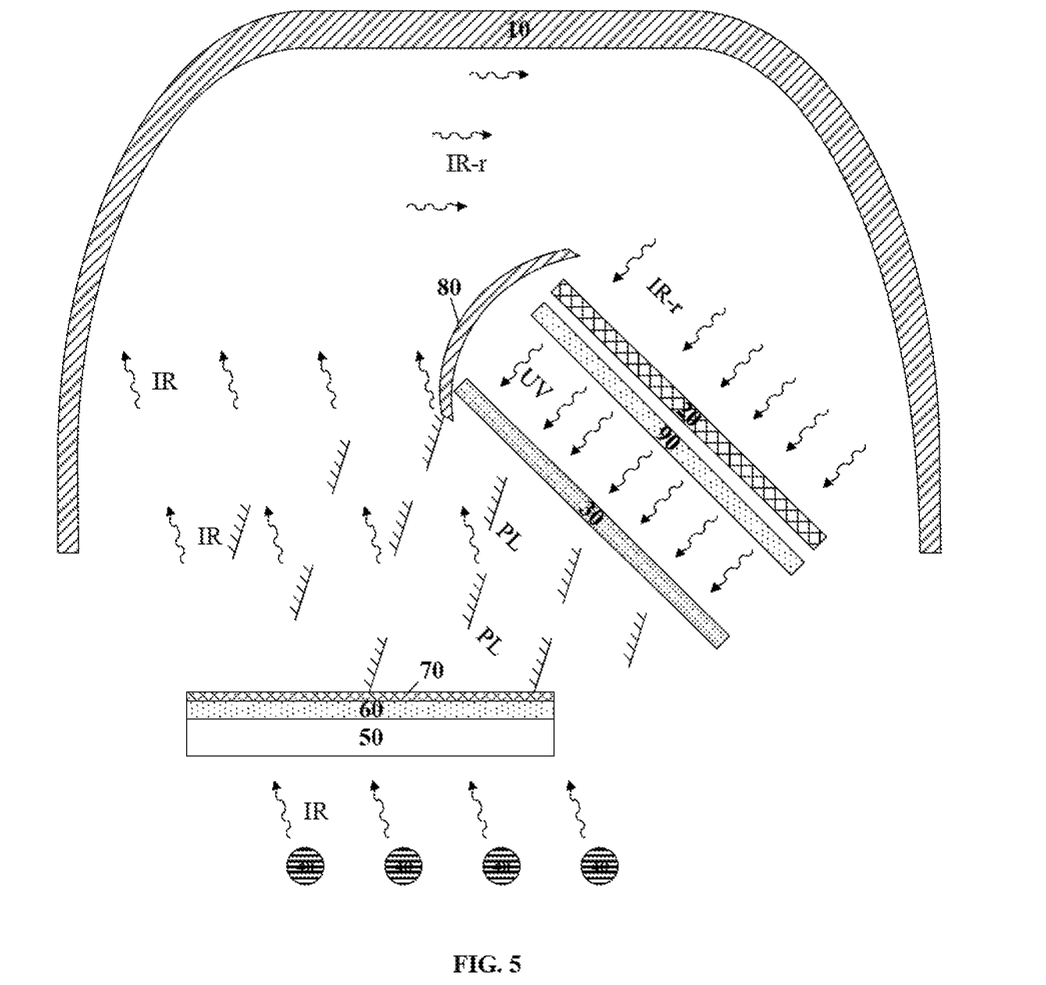
FIG. 5 is a schematic diagram illustrating the structure of an apparatus for photo-alignment process in some embodiments according to the present disclosure.

In some embodiments, the infrared light cut filter 90 is a bi-directional infrared light cut filter configured to block infrared light on both directions. FIG. 5 is a schematic diagram illustrating the structure of an apparatus for photo-alignment process in some embodiments according to the present disclosure. Referring to FIG. 5, the apparatus further includes an infrared light cut filter 90 between the up-conversion layer 20 and the photo-alignment material layer 70 for filtering residual infrared light from the ultraviolet light UV or the polarized ultraviolet light PL. Because the infrared light IR emitted from the infrared light source 40 has an optical path that does not cross over the up-conversion layer 20 and the polarizer 30, the bi-directional infrared light cut filter does not interfere with the transmission of the infrared light IR emitted from the infrared light source 40. The only residual infrared light existing between the up-conversion layer 20 and the photo-alignment material layer 70 is from the reflected infrared light IR-r.

Referring to FIG. 4 again, the apparatus in some embodiments further includes a substantially transparent window 100 (e.g., a quartz window) between the polarizer 30 and the support 50 (e.g., between the polarizer 30 and the photo-alignment material layer 70).

Figure 6:
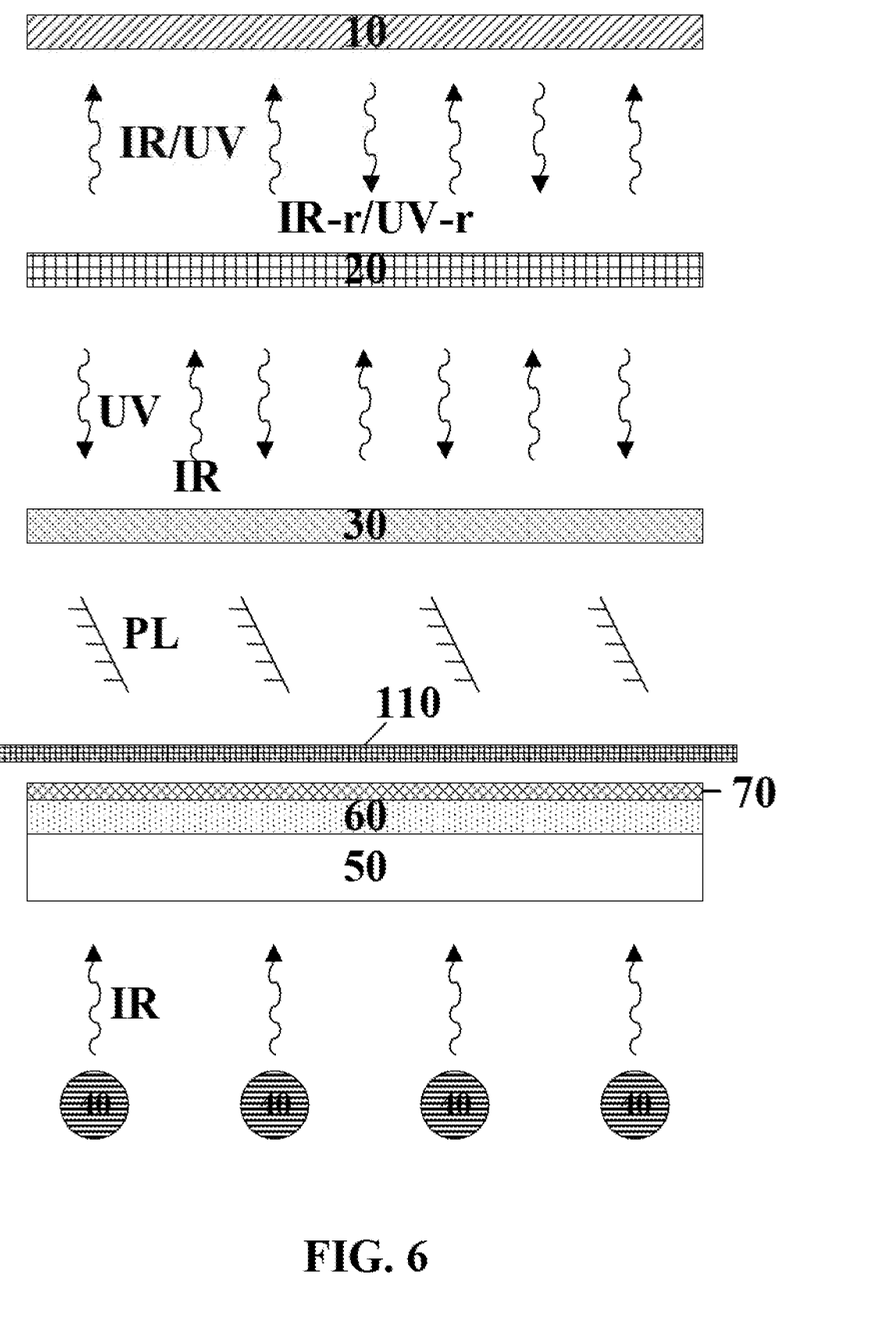
FIG. 6 is a schematic diagram illustrating the structure of an apparatus for photo-alignment process in some embodiments according to the present disclosure.

FIG. 6 is a schematic diagram illustrating the structure of an apparatus for photo-alignment process in some embodiments according to the present disclosure. Referring to FIG. 6, the apparatus in some embodiments further includes an infrared light detector 110 between the support 50 and the polarizer 30, and configured to detect an intensity of the infrared light IR passing through the photo-alignment material layer 70. By having an infrared light detector 110, the degree of curing and photo-alignment in the photo-alignment material layer 70 can be monitored in real time. For example, the correlation between the degree of curing and the photo-alignment and the light intensity of the infrared light IR passing through the photo-alignment material layer 70 can be established empirically. By establishing the empirical correlation, the degree of curing and the photo-alignment can be monitored in real time by monitoring the light intensity of the infrared light IR passing through the photo-alignment material layer 70. Moreover, any defect in the photo-alignment material layer 70 can also be conveniently detected in real time. Based on the determination of the degree of curing and the photo-alignment and the detection of the defects in the photo-alignment material layer 70, various parameters, including a power of the infrared light source 40 and a transmission axis of the polarizer 30, can be optimized to fine-tune the photo-alignment process and the curing process, thereby achieving an optical fabrication efficiency and eliminating defects in the display substrate. Optionally, the infrared light detector 110 includes an infrared light absorption layer.

In another aspect, the present disclosure provides a method of fabricating a liquid crystal display substrate. In some embodiments, the method includes irradiating an infrared light on a photo-alignment material layer to cure the photo-alignment material layer; reflecting the infrared light to generate a reflected infrared light; converting the reflected infrared light to an ultraviolet light; converting the ultraviolet light to a polarized ultraviolet light; and irradiating the polarized ultraviolet light on the photo-alignment material layer on the substrate to align the photo-alignment material layer. Optionally, irradiating the infrared light and irradiating the polarized ultraviolet light are performed substantially simultaneously.

In some embodiments, and referring to FIGS. 1 to 6, the method further includes providing a substrate 60 having a photo-alignment material layer 70 thereon on a support 50. Optionally, the method further includes providing an infrared light source 40 configured to irradiate the infrared light IR on the photo-alignment material layer 70, thereby curing the photo-alignment material layer 70. Optionally, the photo-alignment material layer 70 is disposed on a side of the support 50 distal to the infrared light source 40, and on a side of the substrate 60 distal to the infrared light source 40. After the infrared light IR transmits through the photo-alignment material layer 70, the infrared light IR is reflected to generate the reflected infrared light IR-r.

Referring to FIGS. 1, 4, and 6, in some embodiments, the infrared light IR transmits through the photo-alignment material layer 70, and continues to transmit through a polarizer 30 and an up-conversion layer 20 prior to reflecting the infrared light IR by the reflector 10. Referring to FIGS. 2, 3, and 5, in some embodiments, an optical path of the infrared light IR along a direction from the infrared light source 40 through the photo-alignment material layer 70 to the reflector 10 is substantially non-intersecting with the polarizer 30 and substantially non-intersecting with the up-conversion layer 20.

In some embodiments, the step of irradiating the infrared light IR and the step of irradiating the polarized ultraviolet light PL are performed so that the infrared light IR and the polarized ultraviolet light PL are irradiated on two opposite sides of the photo-alignment material layer 70. Referring to FIGS. 1 to 6, the infrared light IR irradiates substantially on a side of the photo-alignment material layer 70 facing the infrared light source 40, and the polarized ultraviolet light PL irradiates substantially on a side of the photo-alignment material layer 70 facing away the infrared light source 40.

In some embodiments, the method further includes filtering residual infrared light from the ultraviolet light UV or the polarized ultraviolet light PL.

In some embodiments, the method further includes detecting an intensity of the infrared light IR transmitted through the photo-alignment material layer 70.

In another aspect, the present disclosure provides a liquid crystal display apparatus having a liquid crystal display substrate fabricated by the method described herein.

Examples of appropriate display apparatuses include, but are not limited to, an electronic paper, a mobile phone, a tablet computer, a television, a monitor, a notebook computer, a digital album, a GPS, etc.

In another aspect, the present disclosure provides a method of fabricating an apparatus for a photo-alignment process. In some embodiments, the method includes forming a reflector configured to reflect an infrared light, forming an up-conversion layer configured to convert the infrared light to an ultraviolet light; forming a polarizer configured to converting the ultraviolet light to a polarized ultraviolet light. Optionally, the method further includes optically coupling the reflector, the up-conversion layer, and the polarizer together so that the reflector is configured to reflect the infrared light and provide a reflected infrared light to the up-conversion layer; the up-conversion layer is configured to convert the reflected infrared light to the ultraviolet light, and provide the ultraviolet light to the polarizer, and the polarizer is configured to convert the ultraviolet light to the polarized ultraviolet light for the photo-alignment process.

In some embodiments, the method further includes forming a support for receiving a substrate having a photo-alignment material layer thereon. Optionally, the support is formed using a substantially transparent material. Optionally, the up-conversion layer is between the reflector and the polarizer, and the polarizer is between the up-conversion layer and the support. Optionally, the polarized ultraviolet light from the polarizer is configured to irradiate on the photo-alignment material layer on the substrate, thereby aligning the photo-alignment material layer.

In some embodiments, the method further includes forming an infrared light source configured to irradiate the infrared light on the photo-alignment material layer for curing the photo-alignment material layer. Optionally, the photo-alignment material layer is disposed on a side of the support distal to the infrared light source, and on a side of the substrate distal to the infrared light source. Optionally, the apparatus is formed so that the infrared light from the infrared light source is configured to sequentially transmit through the polarizer and the up-conversion layer to the reflector, and subsequently be reflected by the reflector to generate the reflected infrared light. Optionally, the apparatus is formed so that an optical path of the infrared light along a direction from the infrared light source through the photo-alignment material layer to the reflector is substantially non-intersecting with the polarizer and substantially non-intersecting with the up-conversion layer.

In some embodiments, the method further includes forming an infrared light cut filter between the up-conversion layer and the photo-alignment material layer for filtering residual infrared light from the ultraviolet light or the polarized ultraviolet light. Optionally, the infrared light cut filter is a directional infrared light cut filter configured to allow the infrared light to pass through along a direction from the infrared light source toward the reflector, and block the reflected infrared light along a direction from the up-conversion layer toward the photo-alignment material layer. Optionally, the infrared light cut filter is a bi-directional infrared light cut filter configured to block infrared light on both directions.

In some embodiments, the method further includes forming an infrared light detector between the support and the polarizer, and configured to detect an intensity of the infrared light passing through the photo-alignment material layer.

In some embodiments, the method further includes forming a transparent window on a side of the polarizer distal to the up-conversion layer.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An apparatus for a photo-alignment process, comprising a reflector, an up-conversion layer, and a polarizer optically coupled together;
    wherein the reflector is configured to reflect an infrared light and provide a reflected infrared light to the up-conversion layer;
    the up-conversion layer is configured to convert the reflected infrared light to an ultraviolet light, and provide the ultraviolet light to the polarizer; and
    the polarizer is configured to convert the ultraviolet light to a polarized ultraviolet light for the photo-alignment process.

2. The apparatus of claim 1, further comprising a support for receiving a substrate having a photo-alignment material layer thereon;
    wherein the up-conversion layer is between the reflector and the polarizer;
    the polarizer is between the up-conversion layer and the support; and
    the polarized ultraviolet light from the polarizer is configured to irradiate on the photo-alignment material layer on the substrate, thereby aligning the photo-alignment material layer.

3. The apparatus of claim 2, wherein the support is substantially transparent.

4. The apparatus of claim 2, further comprising an infrared light source configured to irradiate the infrared light on the photo-alignment material layer, thereby curing the photo-alignment material layer; the photo-alignment material layer being on a side of the support distal to the infrared light source.

5. The apparatus of claim 4, wherein the infrared light from the infrared light source is configured to sequentially transmit through the polarizer and the up-conversion layer to the reflector, and subsequently be reflected by the reflector to generate the reflected infrared light.

6. The apparatus of claim 4, wherein an optical path of the infrared light along a direction from the infrared light source through the photo-alignment material layer to the reflector is substantially non-intersecting with the polarizer and substantially non-intersecting with the up-conversion layer.

7. The apparatus of claim 2, further comprising an infrared light cut filter between the up-conversion layer and the photo-alignment material layer for filtering residual infrared light from the ultraviolet light or the polarized ultraviolet light.

8. The apparatus of claim 7, wherein the infrared light cut filter is a directional infrared light cut filter configured to allow the infrared light to pass through along a direction from an infrared light source toward the reflector, and block the reflected infrared light along a direction from the up-conversion layer toward the photo-alignment material layer.

9. The apparatus of claim 2, further comprising an infrared light detector between the support and the polarizer, and configured to detect an intensity of the infrared light passing through the photo-alignment material layer.

10. The apparatus of claim 1, wherein the up-conversion layer comprises a doped sodium yttrium fluoride.

11. The apparatus of claim 1, wherein the apparatus is absent of any self-emitting ultraviolet light source.

12. The apparatus of claim 1, further comprising a substantially transparent window on a side of the polarizer distal to the up-conversion layer.

13. A method of fabricating a liquid crystal display substrate, comprising:
   irradiating an infrared light on a photo-alignment material layer to cure the photo-alignment material layer;
   reflecting the infrared light to generate a reflected infrared light;
   converting the reflected infrared light to an ultraviolet light;
   converting the ultraviolet light to a polarized ultraviolet light; and
   irradiating the polarized ultraviolet light on the photo-alignment material layer on a substrate to align the photo-alignment material layer;
   wherein irradiating the infrared light and irradiating the polarized ultraviolet light are performed substantially simultaneously.

14. The method of claim 13, further comprising providing a substrate having a photo-alignment material layer thereon on a support;
   wherein reflecting the infrared light is performed subsequent to the infrared light transmitting through the photo-alignment material layer.

15. The method of claim 14, further comprising providing an infrared light source configured to irradiate the infrared light on the photo-alignment material layer thereby curing the photo-alignment material layer, the photo-alignment material layer being on a side of the support distal to the infrared light source.

16. The method of claim 14, subsequent to the infrared light transmitting through the photo-alignment material layer, further comprising transmitting the infrared light through a polarizer and an up-conversion layer prior to reflecting the infrared light.

17. The method of claim 13, wherein irradiating the infrared light and irradiating the polarized ultraviolet light are performed so that the infrared light and the polarized ultraviolet light are irradiated on two opposite sides of the photo-alignment material layer.

18. The method of claim 13, further comprising filtering residual infrared light from the ultraviolet light or the polarized ultraviolet light.

19. The method of claim 13, further comprising detecting an intensity of the infrared light transmitted through the photo-alignment material layer.

20. A method of fabricating an apparatus for a photo-alignment process, comprising:
   forming a reflector configured to reflect an infrared light;
   forming an up-conversion layer configured to convert the infrared light to an ultraviolet light;
   forming a polarizer configured to converting the ultraviolet light to a polarized ultraviolet light; and
   optically coupling the reflector, the up-conversion layer, and the polarizer together so that:
   the reflector is configured to reflect the infrared light and provide a reflected infrared light to the up-conversion layer;
   the up-conversion layer is configured to convert the reflected infrared light to the ultraviolet light, and provide the ultraviolet light to the polarizer; and
   the polarizer is configured to convert the ultraviolet light to the polarized ultraviolet light for the photo-alignment process.

* * * * *